(12) United States Patent
Parks

(10) Patent No.: US 11,483,568 B2
(45) Date of Patent: Oct. 25, 2022

(54) DATA TRANSMISSION TO MOBILE DEVICES

(71) Applicant: DISPLAYLINK (UK) LIMITED, Cambridge (GB)

(72) Inventor: Matthew Parks, Cambridgeshire (GB)

(73) Assignee: DISPLAYLINK (UK) LIMITED, Cambridge (GB)

(*) Notice: Subject to any disclaimer, the term of this patent is extended or adjusted under 35 U.S.C. 154(b) by 21 days.

(21) Appl. No.: 17/041,636

(22) PCT Filed: Mar. 13, 2019

(86) PCT No.: PCT/GB2019/050705
§ 371 (c)(1),
(2) Date: Sep. 25, 2020

(87) PCT Pub. No.: WO2019/186105
PCT Pub. Date: Oct. 3, 2019

(65) Prior Publication Data
US 2021/0014503 A1 Jan. 14, 2021

(30) Foreign Application Priority Data
Mar. 27, 2018 (GB) ...................................... 1804919

(51) Int. Cl.
*H04N 19/154* (2014.01)
*H04N 19/103* (2014.01)
*G06F 3/01* (2006.01)

(52) U.S. Cl.
CPC ......... *H04N 19/154* (2014.11); *H04N 19/103* (2014.11); *G06F 3/011* (2013.01)

(58) Field of Classification Search
CPC .. H04N 19/154; H04N 19/103; H04N 13/344; H04N 21/2662; H04N 21/42202;
(Continued)

(56) References Cited

U.S. PATENT DOCUMENTS 8,184,069 B1 5/2012 Rhodes
2010/0020868 A1 1/2010 Ayres, Jr. et al.
(Continued)

FOREIGN PATENT DOCUMENTS

CA 2563478 10/2005
EP 1309151 5/2003

OTHER PUBLICATIONS

Perritaz D et al: "Quality of experience for adaptation in augmented reality", Systems, Man and Cybernetics, 2009. SMC 2009. IEEE International Conference on, IEEE, Piscataway, NJ, USA, Oct. 11, 2009 (Oct. 11, 2009), pp. 888-893, XP031575384, ISBN: 978-1-4244-2793-2 p. 1-p. 6.

*Primary Examiner* — Tat C Chio
(74) *Attorney, Agent, or Firm* — Paradice & Li LLP

(57) ABSTRACT

Sensor information is received (S41) at a host device from a mobile device. A pose of the mobile device is then determined by the host device based on the received sensor information. The pose of the mobile device is compared with pose information (S42) of previous poses of the mobile device, each previous pose of the mobile device being associated with a performance level of the system for data transmitted from the host device and received and output at the mobile device having that previous pose. The host device then determines (S43) whether a performance level of the system for the mobile device having the determined pose is likely to be above or below a threshold of acceptability based on the comparison, and, if it is determined that the performance level is likely to be above the threshold of acceptability, setting (S44A) a low level of compression to be applied to the data so that quality of the data transmitted to the mobile device is high, but, if it is determined that the performance level is likely to be below the threshold of acceptability, setting (S44B) a high level of compression to be applied to the data so that quality of the data transmitted
(Continued)

to the mobile device is low, but is more likely to be received and output properly by the mobile device.

20 Claims, 5 Drawing Sheets

(58) Field of Classification Search
CPC ............ H04N 13/194; H04N 21/2402; H04N 21/41407; H04N 21/23439; H04N 19/48; G06F 3/011; G06T 7/20; G06T 1/60; G06T 7/70; G06T 19/006; G06T 2207/30244
See application file for complete search history.

(56) References Cited

U.S. PATENT DOCUMENTS

| | | |
|---|---|---|
| 2014/0176418 A1 | 6/2014 | Ramachandran et al. |
| 2016/0252955 A1 | 9/2016 | Yamamoto et al. |
| 2017/0142447 A1* | 5/2017 | Toth ............... H04N 19/136 |
| 2020/0280739 A1* | 9/2020 | Fitzgerald ......... H04N 19/167 |
| 2020/0288164 A1* | 9/2020 | Lin ................. G06F 3/013 |

* cited by examiner

Figure 3a

| Location | Direction | Angle | Performance |
|---|---|---|---|
| X, Y | E | L55 | Good |
| X1, Y1 | E | L55 | Poor |
| X, Y1 | E | L60 | Poor |
| X, Y1 | NE | R45 | Average |
| X2, Y | N | R110 | Good |
| X2, Y1 | W | L30 | Good |
| ... | | | ... |

Figure 3b

| Location | Direction | Angle | Time |
|---|---|---|---|
| X1, Y1 | E | L54 | 03:30 |
| X1, Y1 | E | L55 | 02:45 |
| X, Y1 | E | L60 | 02:35 |
| X, Y1 | ENE | L60 | 02:30 |
| X, Y1 | E | L75 | 01:56 |
| X, Y1 | NE | R45 | 01:55 |
| ... | | | ... |

Figure 3c

| Location | Direction | Angle | Performance | Compression |
|---|---|---|---|---|
| X, Y | E | L55 | Good | Low |
| X1, Y1 | E | L55 | Poor | Low |
| X, Y1 | E | L60 | Poor | Low |
| X, Y1 | NE | R45 | Average | High |
| X2, Y | N | R110 | Good | High |
| X2, Y1 | W | L30 | Good | High |
| ... | | | | |

DATA TRANSMISSION TO MOBILE DEVICES

CROSS-REFERENCE TO RELATED APPLICATIONS

This application is a U.S. national stage application under 35 U.S.C. § 371 of International Patent Application No. PCT/GB2019/050705, filed on Mar. 13, 2019, which claims the benefit of Great Britain Patent Application No. 1804919.7 filed on Mar. 27, 2018, the contents of each of which are incorporated herein by reference in their entirety.

BACKGROUND

Virtual reality is becoming an increasingly popular display method, especially for computer gaming but also in other applications. This introduces new problems in the generation and display of image data as virtual reality devices must have extremely fast and high-resolution displays to create an illusion of reality and even small reductions in quality are likely to be noticed by a user. This means that a very large volume of data must be transmitted to the device from any connected host.

As virtual-reality display devices become more popular, it is also becoming desirable for them to be wirelessly connected to their host devices. This introduces considerable problems with the transmission of the large volume of display data required, as wireless connections commonly have very limited bandwidth which is liable to fluctuate depending on the location, angle, etc. of the virtual-reality display device and other objects in its surroundings. It is therefore desirable for as much compression to be applied to the display data as possible.

This introduces a trade-off between the desired high quality of the display data for virtual-reality display and the need for compression to be applied.

SUMMARY

Accordingly, in a first aspect, the invention provides a method of transmitting data in a system comprising a host device and a mobile device, the method comprising, at the host device:

receiving sensor information from the mobile device;

determining a pose of the mobile device based on the received sensor information;

comparing the determined pose of the mobile device with pose information of previous poses of the mobile device stored in a memory accessible by the host device, each previous pose of the mobile device being associated with a performance level of the system for data transmitted from the host device and received and output at the mobile device having that previous pose;

determining whether a performance level of the system for the mobile device having the determined pose is likely to be above or below a threshold of acceptability based on the comparison with the performance levels associated with the previous poses;

if it is determined that the performance level to the mobile device having the determined pose is likely to be above the threshold of acceptability, setting a low level of compression to be applied to the data so that quality of the data transmitted to the mobile device is high;

if it is determined that the performance level to the mobile device having the determined pose is likely to be below the threshold of acceptability, setting a high level of compression to be applied to the data so that quality of the data transmitted to the mobile device is low, but is more likely to be received and output properly by the mobile device;

compressing the data to be transmitted to the mobile device by the set level of compression;

transmitting the compressed data to the mobile device;

determining a performance level of the system for the transmitted compressed data; and storing the determined pose of the mobile device and the determined performance level of the system for the transmitted compressed data.

The pose information stored for a pose may include at least position of the mobile device and orientation of the mobile device, which may be provided by at least location of the mobile device, movement of the mobile device, direction of movement of the mobile device, and angle of the mobile device compared to a reference.

In one embodiment, the pose information stored for the pose further includes one or more of velocity of the mobile device, acceleration of the mobile device, time of the pose, a compression level used for compressing the data transmitted from the host device and received and output at the mobile device having that pose, a type of compression used for compressing the data transmitted from the host device and received and output at the mobile device having that pose, and/or system resources that were used by the system at the time the data was transmitted from the host device and received and output at the mobile device having that pose.

In an embodiment, the performance levels associated with previous poses include performance parameters that are used in setting the level of compression to be applied to the data.

The pose information may be only stored for previous poses that have an acceptable performance level, or for previous poses that have an unacceptable performance level.

In one embodiment, comparing the determined pose of the mobile device with pose information of previous poses of the mobile device comprises comparing the determined pose with the pose information of previous poses of the mobile device to find a previous pose that matches the determined pose, wherein matching is either matching completely, or to within a predetermined threshold of accuracy. In an embodiment, if the pose information includes times of the previous poses, the comparing comprises comparing to find a most recent previous pose that matches the determined pose.

If the pose information includes compression levels used for compressing the data transmitted from the host device and received and output at the mobile device for previous poses, and if it is determined that the performance level to the mobile device having the determined pose is likely to be above the threshold of acceptability, the low level of compression may be set to be lower than the compression level used for the previous pose that matches the determined pose.

If the pose information includes compression levels used for compressing the data transmitted from the host device and received and output at the mobile device for previous poses, and if it is determined that the performance level to the mobile device having the determined pose is likely to be below the threshold of acceptability, the high level of compression may be set to he higher than the compression level used for the previous pose that matches the determined pose.

In an embodiment, the method further comprises determining a likely future pose of the mobile device based on pose information of previous poses of the mobile device to determine a progression of the poses of the mobile device. In an embodiment, determining whether a performance level of the system for the mobile device having the determined pose is likely to be above or below a threshold of acceptability is further based on the determined likely future pose of the mobile device.

The method may further comprise analysing the pose information to determine correlations between the pose information and the performance level on which analysis is used in the determining whether a performance level of the system for the mobile device having the determined pose is likely to be above or below a threshold of acceptability.

In one embodiment, the memory in which the pose information of previous poses of the mobile device is stored is a First In First Out (FIFO) memory, storing the pose information of a limited number of previous poses.

The data may comprise image data to be output to a display of the mobile device, or may comprise audio data to be output to a speaker of the mobile device.

According to a second aspect, the invention provides a host device configured to perform the method described above, and in a third aspect, the invention provides a system comprising the host device and a mobile device, which may be a virtual or augmented reality device.

In a further aspect, the invention provides a machine learning system which associates complete pose information with data on historical performance to improve the application of compression, using a method comprising:
1. Determining the pose of a mobile device
2. Determining whether the pose or a similar pose has been previously seen
3. If so, determining the performance of the system at the time the pose was previously seen
4. If the historical performance was above a threshold of acceptability, applying a lower level of compression
5. Otherwise, applying a higher level of compression
6. Recording the current pose of the mobile device and the current level of performance Pose information may include at least position and orientation in space of the mobile device and, may include also, derivatives of time and movement such as velocity and acceleration.

These methods allow the system to use historical data in order to identify problematic poses that result in poor performance—examples of poor performance may include low visual quality, high latency, tearing or the presence of other artefacts, or dropped frames—and pre-emptively lower the bit rate of transmitted data to reduce the chance of poor performance being apparent to the user in future. This improves the accuracy of the trade-off between compression and quality of data.

The methods may be improved upon by using a series of pose data to determine the movement of the mobile device and therefore whether it is moving towards a pose associated with poor performance in the past. This information may then also be used to determine the right compression level to provide a smoother transition period between a normal level of compression and a high or low level of compression.

BRIEF DESCRIPTION OF THE DRAWINGS

Embodiments of the invention will now be more fully described, by way of example, with reference to the drawings, of which:

FIGS. 3a, 3b, and 3c show example performance histories that may be used by the host device of FIG. 2;

DETAILED DESCRIPTION OF THE DRAWINGS

Figure 1:
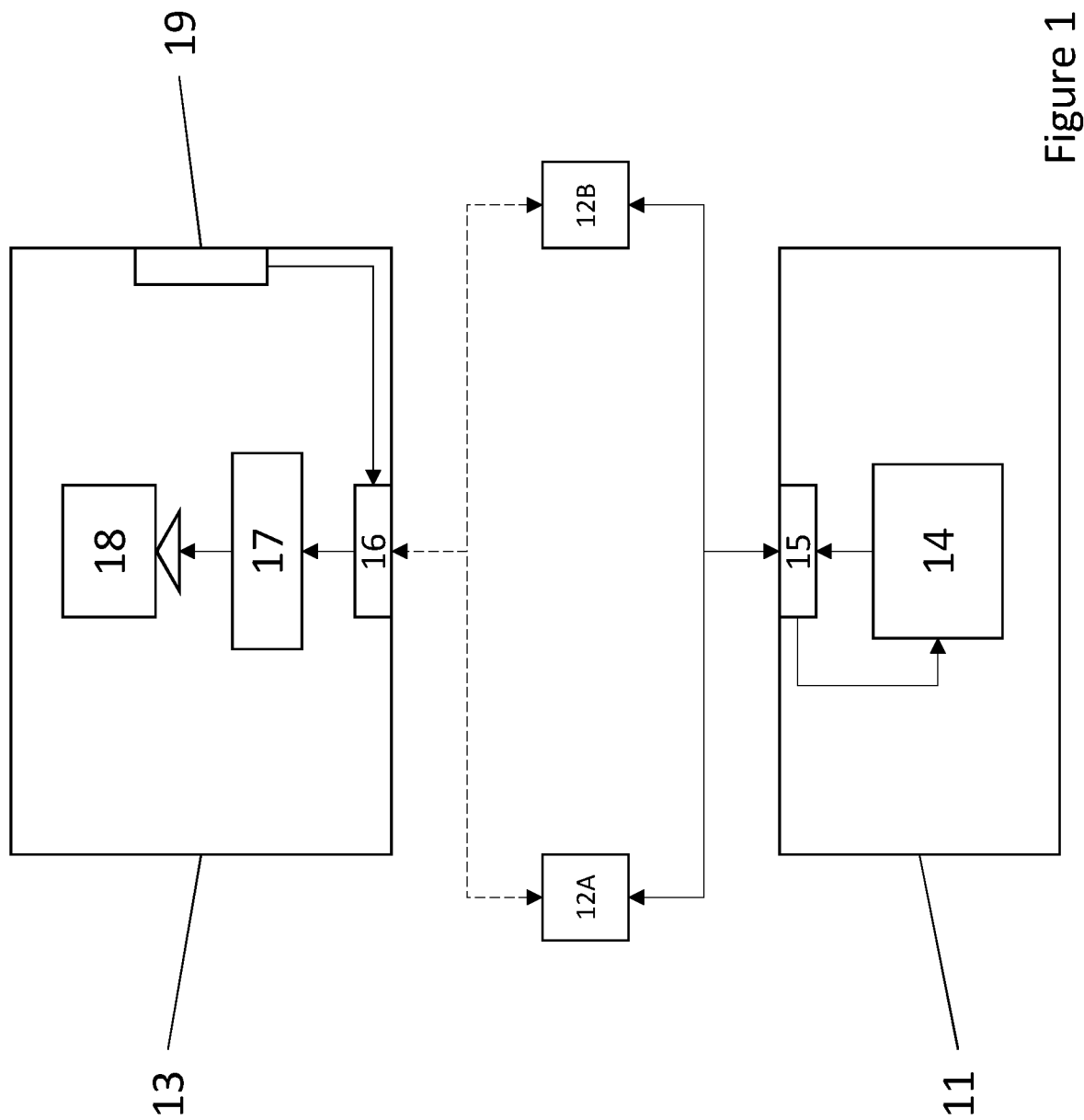
FIG. 1 shows a block diagram of one embodiment of a system according to the invention.

FIG. 1 shows a block diagram of an embodiment of a system, in which a host device [11] such as a game console is connected to two wireless antennae [12]. Each of these antennae [12] has a wireless connection to a mobile device [13]. In FIG. 1, this mobile device is a mobile display device such as a virtual-reality headset or other head-mounted display device, but similar methods could be used for any other type of mobile output device such as wireless headphones. For simplicity, although display data will be referred to in this description, with reference to a display device, it will be appreciated that audio data can be handled in an analogous fashion.

The host device [11] includes, among other components, an application with its associated engines [14] which generates and encodes display data, a process that includes compression. It passes this compressed data to a connection control module [15], which controls the antennae [12]. For this purpose, it is connected to the antennae [12], which may be integral to the host device [11] or may be separate devices with a wired connection to the connection control module [15].

The connection control module [15] is aware of the performance of the wireless connection between the antennae [12] and the mobile device [13] and can communicate with the application [14] to control the encoding of the display data. Two antennae [12] are shown as this is a common topography, but any number of antennae [12] may be used depending on the embodiment.

The antennae [12] are wirelessly connected to a wireless interface [16] of the mobile device [13]. The wireless interface [16] is arranged to receive transmitted display data and pass it to a decoding engine [17], which decompresses and decodes it as appropriate and converts it to a format suitable for display on a display panel [18] connected or integral to the mobile device [11]. It then sends the display data to the display panel [18] for display.

The wireless interface [16] of the mobile device [13] can also transmit data regarding the wireless connection to the antennae [12], which will pass that received data to the connection controller [15]. This data may include feedback on the quality of the connection, such as the number of dropped packets, levels of data corruption when the data was received, or whether data had been delivered within relevant time constraints (e.g are the video frames being received in time for a Vsync interval they target). The mobile device [13] also includes a set of sensors [19] which detect movement, location, and position of the mobile device [13], and these are connected to the wireless interface [16] so that their output can be transmitted to the host device [11] via the antennae [12] for use in the generation of display data as well as for use in the methods of the invention.

As previously mentioned, a similar system may be used for any data that is transmitted as a continuous stream to a mobile device [11], including audio data, and the system will function in much the same way as herein described with appropriate changes such as the substitution of speakers for the display panel [18].

Figure 2:
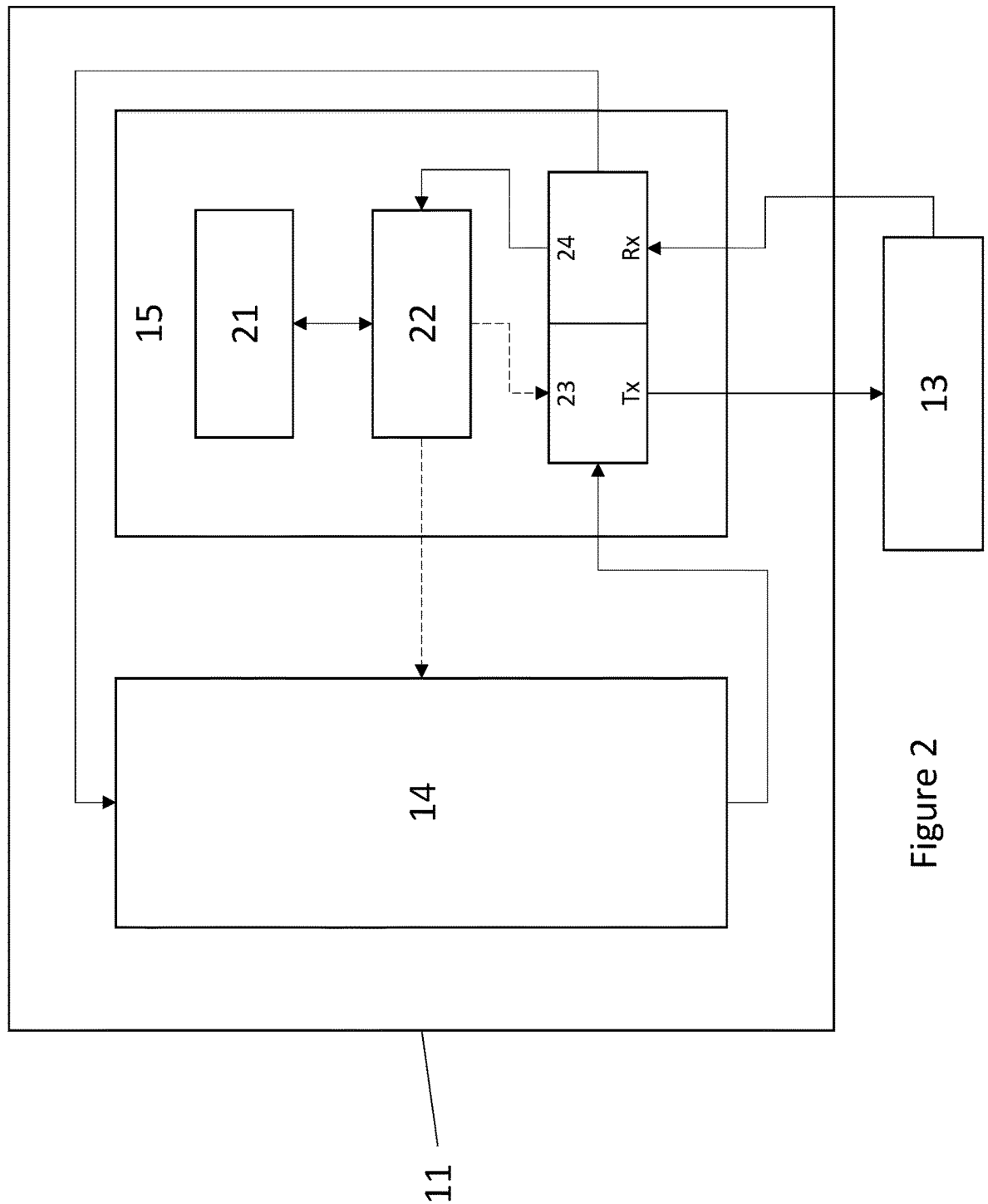
FIG. 2 shows a more detailed block diagram of the host device used in the system of FIG. 1.

FIG. 2 shows a more detailed block diagram of the host device [11], especially of internal components and modules in the connection controller [15]. As previously described, the application [14] is connected to the connection controller [15], but in FIG. 2 the connections are shown in more detail to indicate the components responsible for different parts of the process. Connections that carry display data are shown using solid lines and connections that carry signals for controlling the system are shown using dashed lines.

The connection controller comprises a memory [21] which contains a record of the performance of the display system, connected to a control module [22], which in turn is connected to a transmitter [23] and a receiver [24]. These are connected to the mobile device [13], via the antennae [12], which are not shown in FIG. 2, for transmitting and receiving data respectively.

The application [14] is connected to the transmitter [23] to transmit display data to the mobile device [13], and the receiver [24] to receive sensor data collected by the sensors [19] in the mobile device [13] and transmitted to the host device [11]. The control module [22] is also connected to the application [14] so it can control the processes of encoding.

FIGS. 3a, 3b, and 3c show examples of performance history [21] as stored in the connection controller [15]. The first example, in FIG. 3a, is an example in which the performance status of the wireless connections is saved periodically regardless of quality. It comprises a record of the location of the mobile device [13], the direction in which it was facing, and its angle, either as absolute values or relative to a pre-determined frame of reference such as a specific space determined at initial configuration. These attributes will have been included in the sensor data received from the mobile device [13] and will allow the host device [11] to determine when the mobile device [13] has returned to an exact position that it had previously occupied, using future sensor output. The final attribute stored in the performance history [21] in this example is the display performance, here represented by a simple description "Good", "Average", or "Poor". In other embodiments, the performance may be represented by, for example, a bandwidth, speed, numerical score with greater granularity, or some combination of such descriptors. In this embodiment, the performance history [21] could be stored as a first-in-first-out list (FIFO) so that older records are deleted when the list is filled.

The second example, in FIG. 3b, is an example in which attributes of the position of the mobile device [13] are saved whenever the performance drops below a threshold, for example when frames are dropped or there is a fall in data quality or latency. This may occur when, for example, the bandwidth drops below a certain level, the display data that was transmitted was especially complex and therefore required more computational effort to encode and/or decode, or the signal was interrupted completely. In this example, the same location, direction, and angle attributes as described with reference to FIG. 3a are stored and the final attribute is the time at which each entry in the performance history [21] was made, which may be calculated as a time of day or a time since a known starting point such as the moment of connection, as in this example. Alternatively, the time may be incremented such that it serves as a record of how long ago the entry in the performance history [21] was made. Although not shown, it will be appreciated that an alternative to this example is to save the attributes of the position of the mobile whenever the performance exceeds a threshold.

The third example, in FIG. 3c, includes the level of compression in use at the time each entry in the performance history [21] was made. This example is based on a similar system to the example shown in FIG. 3a, in which the performance status of the wireless connections is saved periodically regardless of quality, but a similar extension could be applied to the system described with reference to FIG. 3b. As in FIG. 3a, the performance history includes a record of the location of the mobile device [13], the direction in which it was facing, and its angle, together making up pose information, and the display performance. In addition, this performance history [21] stores the level of compression in use by the application [14] at each point, here represented by a simple description "High" or "Low", where in high compression the data is compressed to a smaller volume and in low compression the data is less compressed, possibly resulting in a higher-quality image.

The performance recorded and used in the methods of the invention may refer to the performance of the wireless connection, i.e. whether data is transmitted sufficiently quickly and without corruption. Alternatively or additionally, it may refer to the performance of the application in generating and compressing the data transmitted. For example, where the mobile device [13] is a virtual-reality headset the user will be viewing a virtual world on the display panel [18] contained within the virtual-reality headset. Some parts of this virtual world are likely to be more complex than others, and therefore require more time and processing power to generate and compress. Accordingly, regardless of the performance of the wireless connection, the quality of the stream of transmitted data may be affected by the pose of the virtual-reality headset as this will dictate the part of the virtual world displayed on the display panel [18]. Accordingly, the performance history may also include attributes such as a measure of utilisation or amount of available resources such as GPU time available or GPU time used.

In all the examples, there may additionally or alternatively be other attributes such as available resources at the time the record was made. These can be used in addition to pose information and potentially information on the compression level in use as described in FIG. 3c to identify patterns that result in reduced performance, and accordingly there may be multiple records for the same or sufficiently similar poses.

Figure 4:
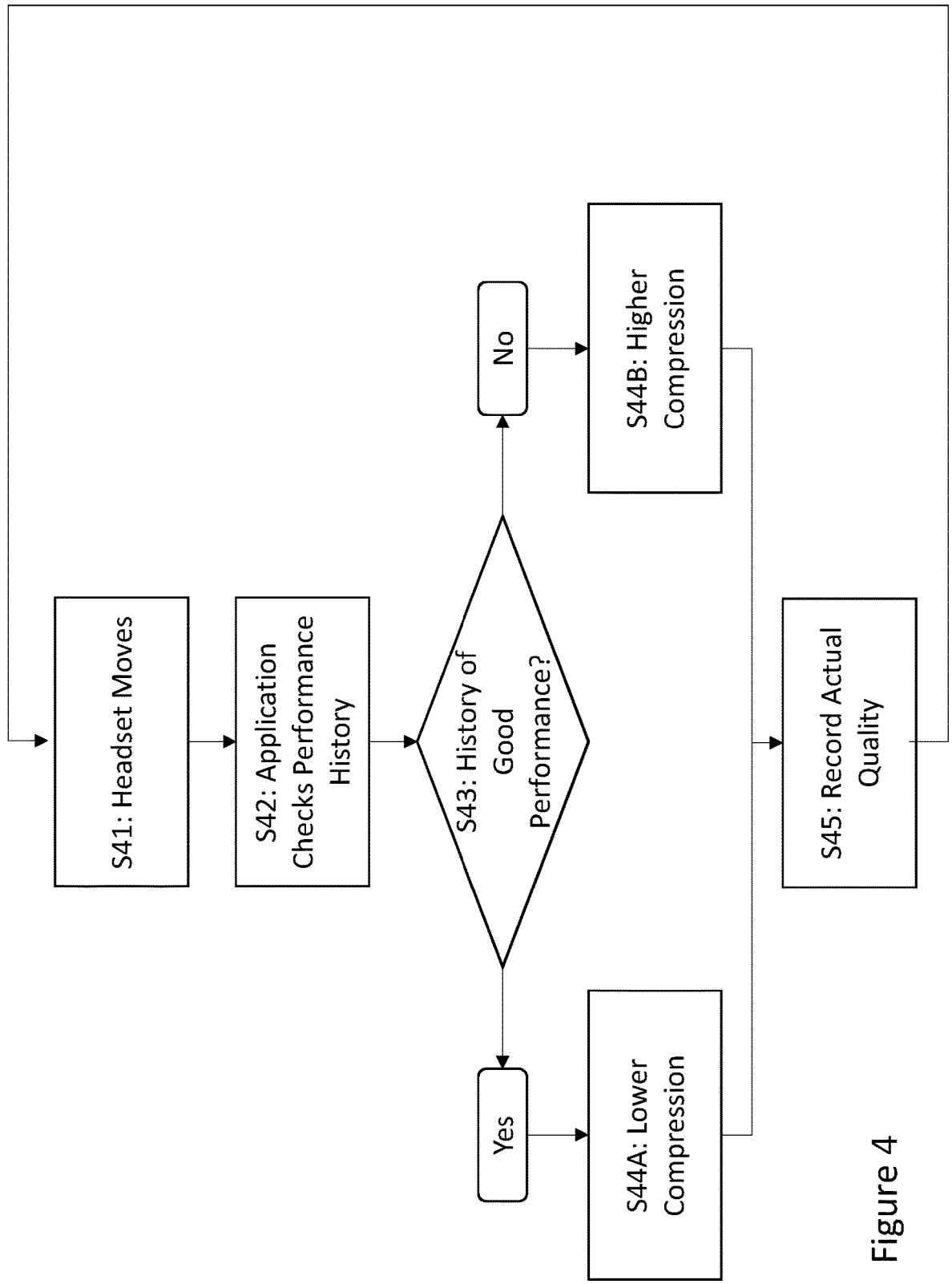
FIG. 4 shows a flow chart illustrating a method according to one embodiment of the invention.

FIG. 4 shows an example process that may be followed in an embodiment of the invention.

At Step S41, the sensors [19] on the mobile device [13] detect movement of the mobile device [13] and pass this information, including the new pose of the mobile device, to the wireless device [16], which transmits it to the host device [11] via the wireless connection to the antennae [12]. This information is passed to the application [14] for use in the generation of display data and to the control module [22] for use in the methods of the invention.

At Step S42, the application [14] generates display data and prepares it for transmission. This may include encoding and compressing the display data. Accordingly, the control module [22] checks the performance history [21] to determine historical performance at the new pose of the mobile device [13].

This determination is made at Step S43: the control module [22] searches for the most recent occasion on which the mobile device [13] was in a similar pose to its current pose, e.g. in the same location, at the same angle, and facing in the same direction. The control module [22] may require an identical pose, or a pose which is similar to the current pose within a threshold of accuracy. Furthermore, components of a pose may be considered independently from one another such that, for example, the control module [22] requires a higher similarity between the current and a previous angle of the mobile device [13] than it does between the current and a previous location in order to consider two poses to be within a threshold of accuracy.

The control module [22] may also use a pattern-matching algorithm taking the pose data and historical quality as inputs to provide a model that determines dependencies between the different components of the pose. For example, over time the control module [22] may determine that a particular angle regularly results in poor quality regardless of the location and direction faced. This information may then be used to adjust the determination of whether the current pose is sufficiently identical to a previous pose as previously mentioned.

In the case of the example shown in FIG. 3a it then checks the historical performance at that time. If it was above a threshold of acceptable quality—for example "Good" or "Average"—the process follows the branch to the left beginning at "Yes". Otherwise it follows the branch to the right beginning at "No". If the current pose of the mobile device [13] is not represented in the performance history [13] the application [14] may determine how to compress the data according to other methods which are not here described.

In the case of the example shown in FIG. 3b the pose of the mobile device [13] is only recorded if performance was poor and therefore it is more likely that the current pose of the mobile device [13] will not be present in the performance history [21]. Therefore, if a similar pose to the current pose is not found in the list of previous poses, the application [14] may assume that the historical performance is acceptable in the current pose of the mobile device [13] (since it is not found to be unacceptable) and therefore follow the branch of the process to the left, beginning at "Yes". Naturally, it may determine from the presence of the pose in the performance record [21] that historical performance in the current pose was poor and therefore follow the branch of the process to the right, beginning at "No". Alternatively, if appropriate data is stored in the performance history [21] such as how many frames were dropped or the level of the bandwidth available, it may apply a further threshold to determine the level of compression to be used. In the alternative version, where the pose of the mobile device [13] is only recorded if performance was acceptable, it is more likely that the current pose of the mobile device [13] will be present in the performance history [21]. Therefore, if a similar pose to the current pose is not found in the list of previous poses, the application [14] may assume that the historical performance is unacceptable in the current pose of the mobile device [13] (since it is not found to be acceptable) and therefore follow the branch of the process to the right, beginning at "No".

The control module [22] may ignore entries in the performance history that are older than a threshold even if they have not yet been removed from the performance history.

Having determined the presence or absence of the current pose of the mobile device [13] in the performance history [21], together with more detailed historical information as appropriate, the control module [22] sends a signal to the application [14] to indicate the historical performance. If there is also other relevant data available in the performance history [21] such as the compression level in use at the time the appropriate record was made, the control module [22] may also pass this information to the application [14].

If the control module [22] determined at Step S43 that there was a history of good performance in the current pose of the mobile device [13], the application [14] follows the branch beginning at "Yes" to Step S44A and applies a lower level of compression to increase the visual quality of the transmitted data. This may mean that the application [14] applies no compression, that it applies a compression algorithm that will lead to no loss of data, or that it applies a compression algorithm that leads to little loss of data.

If the performance history [21] is stored to an appropriate level of granularity, different levels of compression may be applied depending on the exact historical performance. For example, in the example performance history [21] shown in FIG. 3a, if the performance in the current pose was previously recorded as "Good" the application [14] might apply no compression, whereas if it were previously recorded as "Average" the application [14] might apply compression that will not cause data loss. In a case such as that shown in FIG. 3c in which the performance history [21] includes the compression level the application [14] was applying at the time the current pose was last recorded, the application [14] might take this into account. For example, if the performance was previously recorded as "Good" and the compression was recorded as "High", the application might use a level of compression categorised as "Low" and if the performance was previously recorded as "Average" and the compression was recorded as "Low" the application might use a level of compression categorised as "High" in order to improve the performance, but if the performance were recorded as "Average" and the compression as "High", the application might attempt to use a level of compression categorised as "Very High", if it is available.

If the control module [22] determined at Step S43 that there was a history of poor performance in the current pose of the mobile device [13], the application [14] follows the branch beginning at "No" to Step S44B and applies a higher level of compression in order to reduce the volume of the transmitted data. This will decrease the required bitrate of transmission and therefore increase the chance of the whole frame being successfully transmitted in time to be displayed on the display panel [18]. It therefore reduces the chance of the frame being dropped.

As in the case where a low level of compression is being applied, if the performance history [21] is stored to an appropriate level of granularity different levels of higher compression might be applied. For example, if the example performance history [21] shown in FIG. 3b also stored the number of frames dropped on each occasion, the application [14] might apply a very high level of compression if the number of frames dropped were above a threshold and a lower level of compression if the number of frames dropped were below that threshold. As previously mentioned, the application might also bear in mind the level of compression in use at the time the previous record was made and use this as a baseline for decisions on what level of compression it should apply, for example by applying a higher compression level than it did the last time the current pose was recorded, regardless of other considerations.

If the connection is in operation for a long period of time and a sufficient performance history [21] is collected, the connection controller [22] may use a pattern-matching algorithm which takes the pose values—location, angle, and direction faced—together with the quality and determines whether the performance will be acceptable given those inputs such that Performance=f(location, angle, direction, quality)

to determine the highest quality that will produce an acceptable performance. For example, it might insert the location, angle, and direction into the algorithm together with progressively lower qualities until the algorithm returns an acceptable performance, and then use the compression level associated with that quality. In any case, the application [14] compresses the data and passes it to the transmitter [23] for transmission via the antennae [12] and the wireless connection to the mobile device [13], where it is received by the wireless device [16] and passed to the decoding engine [17] for decoding. For this purpose, the application [14] may also transmit details of the compression used to allow the decoding engine [17] to decode the received data correctly. Once the display data has been decoded, it is passed to the display panel [18] for display.

At Step S45, which may be simultaneous with the transmission of the data or occur after transmission is complete, the connection controller [22] stores the actual performance as appropriate. For example, in the case of the example shown in FIG. 3a it might record the current pose of the mobile device [13] and the current performance level, possibly also using input from the mobile device [13] to accurately determine the current performance. In the example shown in FIG. 3b it might wait for feedback from the mobile device [13] indicating, for example, that the data was not successfully transmitted and only if the problems with transmission were above a threshold of severity record the current pose of the mobile device [13] in the performance history [21], possibly overwriting the record of the last time the current pose was recorded.

The process is then repeated for the life of the connection.

Figure 5:
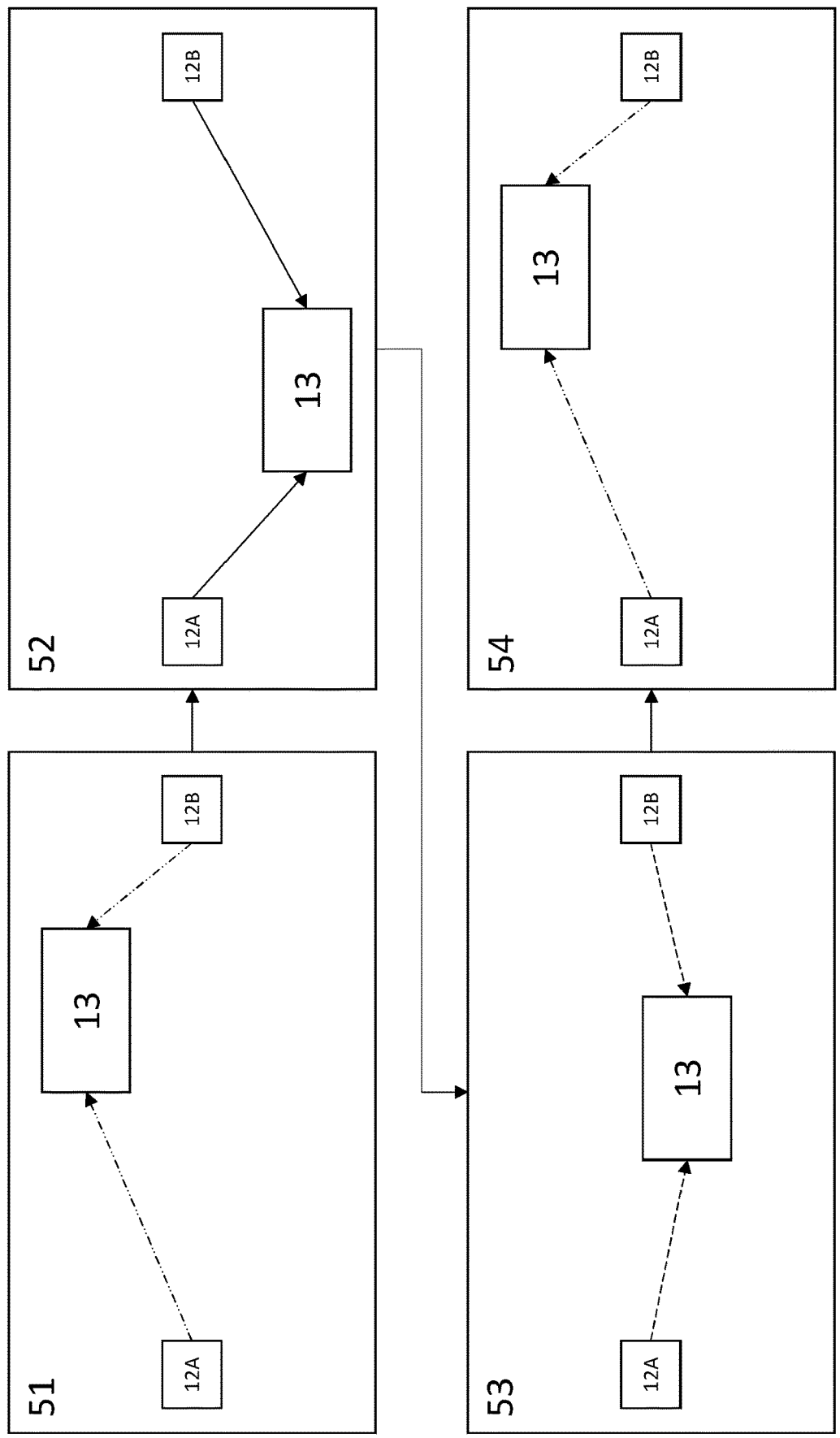
FIG. 5 shows how the method illustrated in FIG. 4 may be used in a situation with changing signal strength and quality within a space.

FIG. 5 shows a further example of the process in action. It comprises four steps, each showing the two antennae [12A, 12B] and the mobile device [13] within a space. In each step, the mobile device [13] has moved to a new location; other pose information is not included for clarity, and for simplicity in this example signal quality is assumed to be the only factor affecting performance although, as previously mentioned, there may be other factors. The wireless connections between each antenna [12A, 12B] and the mobile device [13] are shown using arrows connecting the devices, the arrows being differently patterned depending on signal strength. Poor signal is indicated by a pattern of dots and dashes, average signal by a dashed line, and good signal by a solid line.

In the first step [51], the mobile device [13] has moved to an area with poor signal for the first time. This may, for example, be due to obstructions, the angle of the antennae [12A, 12B], or other interference. In any case, this poor signal results in poor performance. As previously described in FIG. 4, having transmitted display data to the mobile device [13] the control module [22] on the host device [11] will record in the performance history [21] the location of the mobile device [13] and the fact that the performance was poor. Since in this example it is the first time the mobile device [13] has moved to that location, the host device [11] may have compressed the transmitted data using a default method, which may have resulted in a sudden drop in overall quality due to, for example, dropped frames.

In the second step [52], the mobile device [13] has moved to a location in which the performance has improved. For the purposes of this example, this is because the signal has improved. If this is the first time the mobile device [13] has been in this location, the host device [11] may compress transmitted data using a default method which may be acceptable but may lead to excessive compression and therefore an unnecessary reduction in the quality of the display data transmitted due to, for example, blockiness in images caused by the compression process. To avoid this in future, in some embodiments the control module [22] may record the mobile device's [13] location and the performance in the performance history [21] even though the performance is good, as described with reference to FIG. 3a.

In the third step [53], the mobile device [13] has moved to a location in which the performance is merely acceptable and, again, the performance may be recorded in the performance history [21].

In the fourth step [54], the mobile device [13] has returned to the location it occupied in the first step, but because this location has been recorded, when the control module [22] checks the performance history [21] it can determine that the performance was previously poor in this location and signal the application [14] accordingly. The application [14] can then pre-emptively apply a higher level of compression, reducing the chances of dropped frames.

Furthermore, the application [14] may determine the movements of the mobile device [13] over time such that between the second and third steps the application [14] may use the changing performance level together with a comparison of the locations of the mobile device [13] at each time to determine that the mobile device [13] is moving towards the location occupied at the first [51] and fourth [54] steps and therefore predict that the performance level is about to fall. The application [14] may therefore pre-emptively begin applying progressively higher levels of compression to not only anticipate deterioration in performance before it actually occurs but also provide a smoother transition between levels of compression and therefore an improved user experience.

Likewise, if the user were then to move towards a location where performance had previously been good, the level of compression applied might be progressively lowered in the same way, to provide a smoother transition while taking advantage of the likely ability to transmit better-quality display data while still achieving good performance.

Although only a few particular embodiments have been described in detail above, it will be appreciated that various changes, modifications and improvements can be made by a person skilled in the art without departing from the scope of the present invention as defined in the claims. For example, hardware aspects may be implemented as software where appropriate and vice versa.

The invention claimed is:

1. A method of transmitting data in a system comprising a host device and a mobile device, the method comprising, at the host device:
   receiving sensor information from the mobile device;
   determining a pose of the mobile device based on the received sensor information;
   comparing the determined pose of the mobile device with pose information of previous poses of the mobile device stored in a memory accessible by the host device, each previous pose of the mobile device being associated with a performance level of the system based on data transmitted from the host device and received and output at the mobile device while having that previous pose;
   determining whether a predicted performance level of the system associated with the determined pose is above or below a threshold of based on the comparison with the performance levels associated with the previous poses;
   when the predicted performance level determined to be at or above the threshold selecting a first level of compression to be applied to the data;
   when the predicted performance level determined to be below the threshold selecting a second level of compression to be applied to the data, the second level of compression being higher than the first level of compression;

compressing the data to be transmitted to the mobile device by the selected level of compression;

transmitting the compressed data to the mobile device;

determining a current performance level of the system for the transmitted compressed data; and storing the determined pose of the mobile device and the current performance level of the system for the transmitted compressed data.

2. The method according to claim 1, wherein the pose information stored for a pose includes at least:
position of the mobile device; and
orientation of the mobile device.

3. The method according to claim 1, wherein the pose information stored for a pose includes at least:
location of the mobile device;
movement of the mobile device;
direction of movement of the mobile device; and
angle of the mobile device compared to a reference.

4. The method according to claim 2, wherein the pose information stored for the pose further includes one or more of:
velocity of the mobile device;
acceleration of the mobile device;
time of the pose;
a compression level used for compressing the data transmitted from the host device and received and output at the mobile device having that pose;
a type of compression used for compressing the data transmitted from the host device and received and output at the mobile device having that pose; or
system resources that were used by the system at the time the data was transmitted from the host device and received and output at the mobile device having that pose.

5. The method according to claim 1, wherein the performance levels associated with previous poses include performance parameters that are used in Getting selecting the level of compression to be applied to the data.

6. The method according to claim 1, wherein the pose information is only stored for previous poses that have performance levels at or above a threshold performance level.

7. The method according to claim 1, wherein the pose information is only stored for previous poses that have performance levels below a threshold performance level.

8. The method according to claim 1, wherein comparing the determined pose of the mobile device with pose information of previous poses of the mobile device comprises comparing the determined pose with the pose information of previous poses of the mobile device to find a previous pose that matches the determined pose, wherein matching is either matching completely, or to within a predetermined threshold of accuracy.

9. The method according to claim 8, wherein if the pose information includes times of the previous poses, the comparing comprises comparing to find a most recent previous pose that matches the determined pose.

10. The method according to 8, wherein if the pose information includes compression levels used for compressing the data transmitted from the host device and received and output at the mobile device for previous poses, and if predicted performance level determined to be above the threshold, the first level of compression is set selected to be lower than the compression level used for the previous pose that matches the determined pose.

11. The method according to claim 8, wherein if the pose information includes compression levels used for compressing the data transmitted from the host device and received and output at the mobile device for previous poses, and if the predicted performance level is determined to be below the threshold, the second level of compression is selected to be higher than the compression level used for the previous pose that matches the determined pose.

12. The method according to claim 1, further comprising determining a future pose of the mobile device based on pose information of previous poses of the mobile device to determine a progression of the poses of the mobile device.

13. The method according to claim 12, wherein the determining of whether the predicted performance level of the system associated with the determined pose is above or below the threshold is further based on the determined future pose of the mobile device.

14. The method according to claim 1, further comprising analysing the pose information to determine correlations between the pose information and a performance level on which analysis is used in the determining of whether the predicted performance level of the system associated with the determined pose is above or below the threshold.

15. The method according to claim 1, wherein the memory in which the pose information of previous poses of the mobile device is stored is a First In First Out (FIFO) memory, storing the pose information of a limited number of previous poses.

16. The method according to claim 1, wherein the data comprises image data to be output to a display of the mobile device.

17. The method according to claim 1, wherein the data comprises audio data to be output to a speaker of the mobile device.

18. A host device configured to:
receive sensor information from a mobile device;
determine a pose of the mobile device based on the received sensor information;
compare the determined pose of the mobile device with pose information of previous poses of the mobile device stored in a memory accessible by the host device, each previous pose of the mobile device being associated with a performance level of a system that includes the host device and the mobile device based on data transmitted from the host device and received and output at the mobile device while having that previous pose;
determine whether a predicted performance level of the system associated with the determined pose is above or below a threshold based on the comparison with the performance levels associated with the previous poses;
when the predicted performance level is determined to be at or above the threshold, selecting a first level of compression to be applied to the data; or
when the predicted performance level is determined to be below the threshold, selecting a second level of compression to be applied to the data so that quality of the data, the second level of compression being higher than the first level of compression;
compress the data to be transmitted to the mobile device by the selected level of compression;
transmit the compressed data to the mobile device;
determine a current performance level of the system for the transmitted compressed data; and store the determined pose of the mobile device and the current performance level of the system for the transmitted compressed data.

19. A system comprising the host device of claim 18 and a mobile device.

20. The system according to claim 19, wherein the mobile device is a virtual reality device or an augmented reality device.

* * * * *

UNITED STATES PATENT AND TRADEMARK OFFICE
CERTIFICATE OF CORRECTION

PATENT NO. : 11,483,568 B2
APPLICATION NO. : 17/041636
DATED : October 25, 2022
INVENTOR(S) : Matthew Parks Page 1 of 1

It is certified that error appears in the above-identified patent and that said Letters Patent is hereby corrected as shown below:

In the Claims

In Column 10, Line 61, in Claim 1, delete "below a threshold of based on the comparison with the" and insert -- below a threshold based on the comparison with the --

In Column 10, Line 63, in Claim 1, delete "when the predicted performance level determined to be at" and insert -- when the predicted performance level is determined to be at --

In Column 10, Line 64, in Claim 1, delete "or above the threshold selecting a first level of com-" and insert -- or above the threshold, selecting a first level of com- --

In Column 10, Line 66, in Claim 1, delete "when the predicted performance level determined to be" and insert -- when the predicted performance level is determined to be --

In Column 10, Line 67, in Claim 1, delete "below the threshold selecting a second level of com-" and insert -- below the threshold, selecting a second level of com- --

In Column 11, Line 41, in Claim 5, delete "Getting"

In Column 11, Line 66, in Claim 10, delete "predicted performance level determined to be above the" and insert -- the predicted performance level is determined to be above the --

In Column 11, Line 67, in Claim 10, delete "threshold, the first level of compression is set selected to be" and insert -- threshold, the first level of compression is selected to be --

Signed and Sealed this
Twenty-second Day of November, 2022

Katherine Kelly Vidal
*Director of the United States Patent and Trademark Office*